J. Sherman.
Animal Trap.
No. 81829.   Patented Sept. 1, 1868.
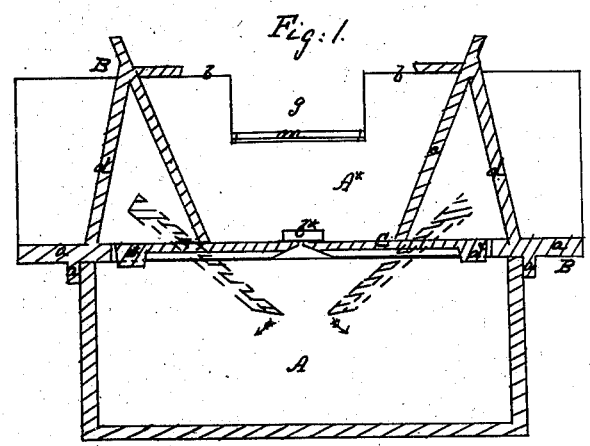
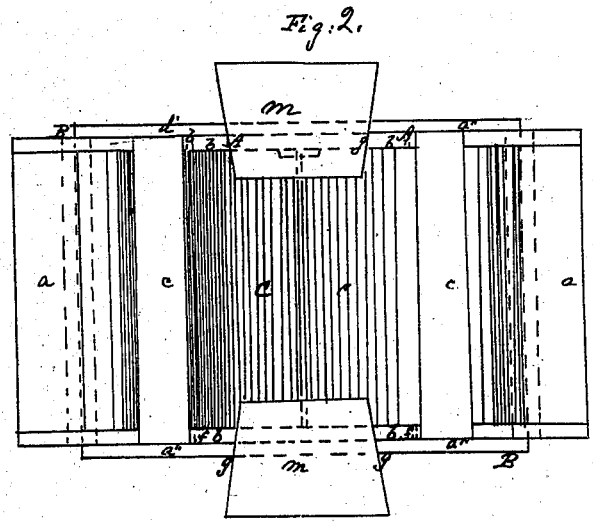
Witnesses.

United States Patent Office.

JEREMIAH SHERMAN, OF NEW OXFORD, PENNSYLVANIA.

Letters Patent No. 81,829, dated September 1, 1868.

---

IMPROVED ANIMAL-TRAP.

---

The Schedule referred to in these Letters Patent and making part of the same.

---

TO ALL WHOM IT MAY CONCERN:

Be it known that I, JEREMIAH SHERMAN, of New Oxford, in the county of Adams, and State of Pennsylvania, have invented certain new and useful Improvements in Animal-Traps; and I do hereby declare that the following is a full, clear, and exact description of the same, reference being had to the accompanying drawings, making a portion of this specification, in which—

Figure 1 is a vertical transverse section of an animal-trap constructed according to my invention.

Figure 2 is a plan view of the same.

Similar letters of reference indicate corresponding parts in both figures.

This invention consists in a novel arrangement and combination of bridge-ways with the pivoted gates or valves and other parts of the trap, whereby the trap is rendered much more certain of access to the animal which it is designed to catch, than would be the case if such bridge-ways were dispensed with.

To enable others to understand the construction and operation of my invention, I will proceed to describe it with reference to the drawings.

A represents a cage, which may consist simply of a rectangular box, which has placed or secured thereon a detachable frame, B, the horizontal end-pieces, $a$, of which are furnished with downwardly-projecting cleats, $a'$, which, in conjunction with upwardly-extending cleats, $a''$, provided upon the sides of the cage A, and extending past the corresponding edges of the frame, serve to retain the frame in place upon the cage.

Formed between the vertical end-boards, $b$, and the inclined side-boards, $c$, of the frame, is a passage, A*, and the frame, furthermore, should be provided with shield-boards, $d$, attached at their upper edges to those of the side-board, and at their lower edges to the end-pieces, $a$, as shown in fig. 1, and the purpose of which will hereinafter appear.

Shown at C are two gates, pivoted to the end-boards $b$ by pivots projecting from their ends, as shown in dotted outline at $f$, and fitted into suitable holes or sockets provided near the lower edges of the end-boards. The outer edges of these gates C are loaded, as shown at $a^*$, in order that they may be kept thereby in a horizontal position, except during the time actually occupied by the entrance of the animals into the cage A, as presently herein explained, the inner edges of the two gates being situated close to each other, and prevented from rising, one higher than the other, by a stop, $b^*$, affixed to one of the end-boards $b$.

Each of the end-boards $b$ has, formed centrally in the upper part thereof, a passage-way, $g$, placed at the bottom of and extending through which is a bridge-way, $m$, which facilitates the approach of the animals to the passage A*.

In the operation of the trap, an animal passing upon one of the bridge-ways $m$, through the passage-ways $g$, jumps into the passage A* to seize any suitable bait laid upon the inner portions of the gates at the bottom of the passage. As the animal strikes the portions just mentioned of the gates, the latter are turned upon their pivots, thus letting fall the animal into the cage A, whereupon the gates, being loaded to nearly balance, as hereinbefore described, move back to their horizontal position, thus closing the cage and resetting the trap, so that any number which the cage is capable of containing of rats or other animals may be caught without the necessity of resetting the trap. The escape of any of the animals from the cage, while the outermost portions of the gates are elevated by the downward movements of the inner portions of the same in admitting another, is effectually provided against by the shield-boards $d$, which shut off all means of egress from this source, and if the animal, on alighting on the pivoted gate, feeling his danger, should secure a hold on the inclined side-board $c$ and run up it, on reaching the overlapping-board $h$, it would be caused to loose its hold and fall back on the gate, thus preventing any possibility of escape when once over the bridge-way.

The captured animals may be readily removed from the trap by simply taking the frame B from the cage.

What I claim as my invention, and desire to secure by Letters Patent, is—

The combination of the bridge ways $m$ in the side-boards $b$, the inclined side-boards $c$, and overlapping-boards $h$, with the passage A*, pivoted gates C, and cage A, all arranged, substantially as shown and described.

JEREMIAH SHERMAN.

Witnesses:
ELIAS ROTH,
GEORGE SHANE.